Figure 1:
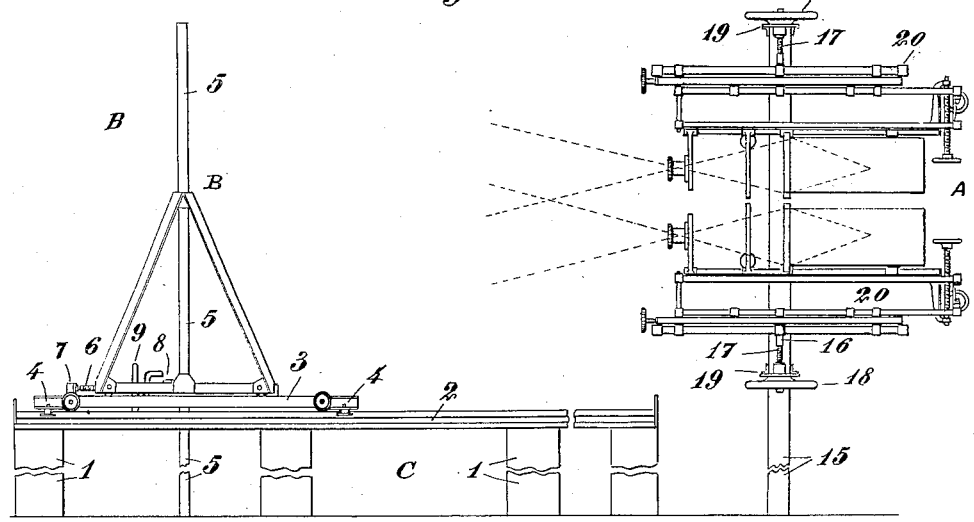

U. NISTRI.
METHOD OF PHOTOGRAMMETRIC SURVEY AND APPARATUS THEREFOR.
APPLICATION FILED SEPT. 22, 1920.

1,396,047.

Patented Nov. 8, 1921.
2 SHEETS—SHEET 1.

Inventor:
Umberto Nistri

U. NISTRI.
METHOD OF PHOTOGRAMMETRIC SURVEY AND APPARATUS THEREFOR.
APPLICATION FILED SEPT. 22, 1920.
1,396,047.
Patented Nov. 8, 1921.
2 SHEETS—SHEET 2.
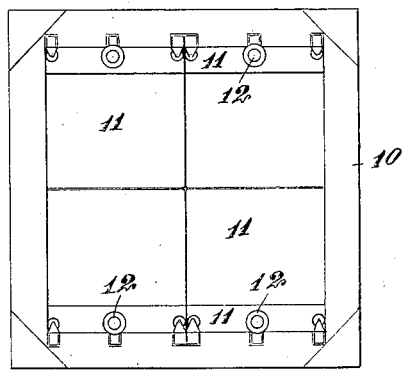
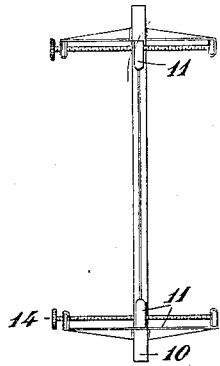
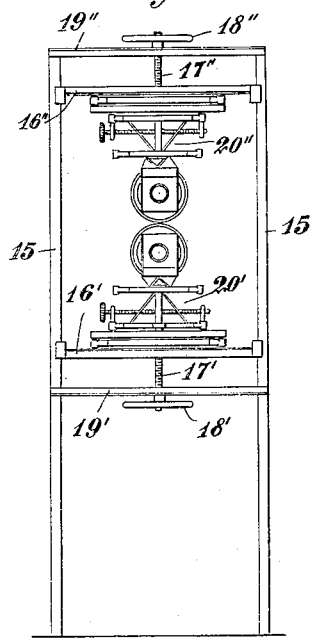
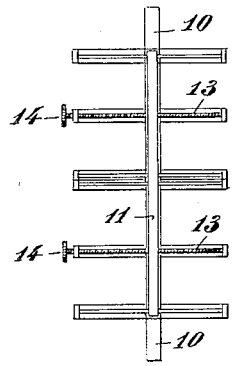
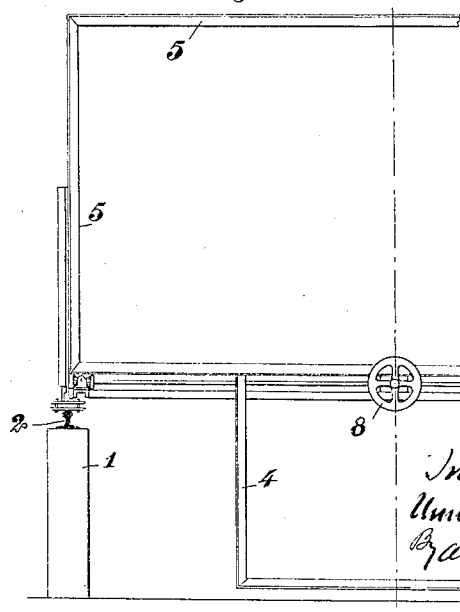
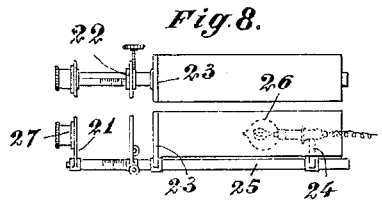

UNITED STATES PATENT OFFICE.

UMBERTO NISTRI, OF ROME, ITALY.

METHOD OF PHOTOGRAMMETRIC SURVEY AND APPARATUS THEREFOR.

1,396,047.  Specification of Letters Patent.  Patented Nov. 8, 1921.

Application filed September 22, 1920. Serial No. 412,025.

*To all whom it may concern:*

Be it known that I, UMBERTO NISTRI, a subject of the King of Italy, residing at Rome, Italy, have invented certain new and useful Improvements in Methods of Photogrammetric Survey and Apparatus Therefor, (for which I have filed applications in Italy on May 15, 1919, and on August 19, 1919,) of which the following is a description.

When there are two photographs of a tract of ground taken from different points of known position, by means of a camera of which are known the focal distance, the orientation and inclination of the plates, as well as the position of the fundamental elements on the latter *i. e.*: the principal point and trace of the main vertical and of the horizontal plane passing through the second nodal point of the lens, a complete survey of the said tract of ground can be obtained, as is well known, with the aid of analytical, geometrical or stereoscopic methods.

The analytical and geometrical methods essentially consist in determining by graphical or analytical processes, the position of the point wherein intersect the two visuals directed from the two known stations to the same point of the ground, as it appears on the two photographs.

According to the stereoscopic methods the two images are arranged in such a way that to the observer they present a picture in relief, and on the plane wherein the two images are formed, two reference marks are provided, one fixed and one movable, the latter being susceptible of receiving exactly measurable movements. To the different relative positions of these two marks correspond, as its well known, different stereoscopical images of the mark, which appear to the observer as being suspended in the air at different distances and whose value is readily calculated from that of the relative position of the images of the two marks in the field of the ocular. By making this stereoscopical image of the mark to coincide with the image of a point of the ground, the distance of the latter is determined. In other words, the movable marks serve to determine the parallax of the two images of one point of the ground upon the two plates, and from the value of this parallax the distance of the point is deduced.

Now, my invention has for its object a surveying method wherein, in a certain way, the above said process is inverted in that instead of changing the parallax of an artificial reference point to render it equal to that of a point of the ground and then effect the coincident of their stereoscopic images, the parallax actually belonging to the point on the ground is left fixed and, by projecting the two photogrammetrical plates on to a movable plane, the distance of the latter is caused to vary, keeping it conveniently oriented in respect to the plates up to the moment wherein, at the scale of the map, it passes through the point on the ground in question. In this position, the two rays projecting the images of the two plates intersect in the point on the screen, while they intersect at different points for any other position. From the coincidence then of the two images of the same point on the screen it follows that the latter is at the required distance corresponding to that of the point.

In the particular instance described hereafter, by way of example, wherein the two photographs of the ground are obtained from a moving airship and the screen upon which the projection of the two plates is to be made, is moved parallel to the horizontal plane, the points at which the plane corresponding to the screen intersects the ground, constitute exactly the contour lines along which the images of the ground points will coincide with each other on the screen.

In practice when the survey is made from the ground, the method is carried out by taking photographs of the same tract from two points of a known position and with a determined orientation of the plates. When the survey shall be made from a moving airship, three or preferably four, points of known position should be provided on the ground, by means of which points the distance and the relative position of the two plates, in respect to the ground and between them, at the moment of the exposure, can be afterward determined.

Assuming for mere generality, that the photographs of the ground to be used have been obtained from an airship, then the first operation to be carried out is to position the plates in the identical relative position and orientation which they had at the moment of the exposure. For that purpose the positions of the three reference points are marked upon a projection plane, and the two plates are fitted in two projecting apparatuses which will allow the former of taking any orientation whatever in the space. Then the images of the three reference points, projected upon the reference plane, are brought to coincide with the three points, previously marked on said plane, by shifting the latter and successively changing in a suitable manner, the orientation and the position of the two plates.

The projecting apparatuses are now fixed, whereas the screen or reference plane is positioned in respect of them in the same manner as the horizontal plane. The operation for obtaining the coincidence of the points can now be started which operation consists in shifting the projection or reference plane parallelly to itself, while the focal length of the projecting apparatuses is correspondingly varied, in order to have always focused the projected images, the variations being the same in the two apparatuses.

If instead of a triangle there is at disposal a fundamental quadrangle, the fourth point serving as a control for the others, the operations for orientating the plates are to be slightly modified, as it will be shown more in detail in the following description, which refers to this case.

Figure 2:
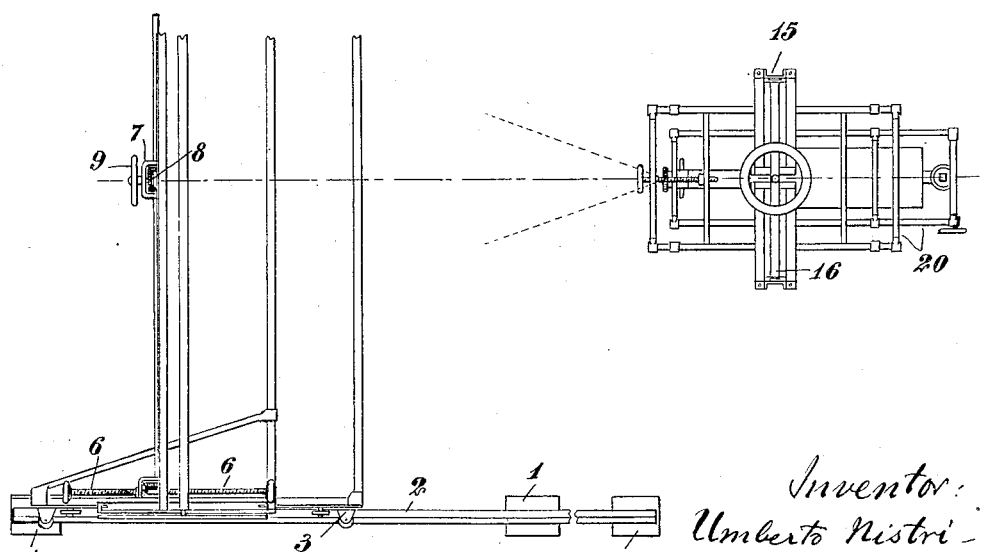

In the drawing herewith wherein, by way of example, one construction of the apparatus is illustrated, Figures 1 and 2 represent respectively a side and top view of the complete apparatus; Fig. 3 is a front elevation of the movable screen frame with the four quadrant-screens in place; Fig. 4 is a transverse vertical section of the screen bearing frame; Fig. 5 is a plan view of the screen bearing frame; Fig. 6 is a front elevation of the frame with the projecting apparatus. Fig. 7 is a front elevation of one half of the movable carriage with the screen bearing frame. Fig. 8 shows a side view of the two projecting apparatuses.

As appears from the drawing, the apparatus comprises the projection lamp carrier A mounted on a standard, the screen bearing frame B mounted upon a movable carriage 3, and the work bench C.

As shown in the drawing, the work-bench consists of a number of pillars 1 supporting rails 2 forming a track for the carriage 3 which is kept steady during its movement by a system of wheels having vertical axes 4 bearing against the said rails.

The carriage 3 carries the screen-bearing frame 5 which can be shifted in the same direction of the movement as the carriage by means of a double set of screws 6 provided on carriage 3 and nut 7 provided on the frame, all adjustable by means of an operating gear 8 under the control of a single hand wheel 9.

The sliding of the carriage upon the track effects the coarse adjustment and the operation of the said screws the fine adjustment of the frame. The latter is designed for receiving the different screens which are successively used in the operations to be carried out. The screen bearing frame hereinafter called the quadrant screen, has movable quadrants for fixing in the positions corresponding to their relative heights the four vertexes of the fundamental quadrangle.

The frame is a strong frame 10 (Figs. 3, 4 and 5) which can be mounted on the vertical frame 5 above mentioned. Within frame 10 are placed four ground glass quadrants 11, which fit together along their inner edges and with them outer edges rest against the inner edge of the frame containing them. Sliding tubes 12 are fitted normally to the plane of the frame and of the quadrants 11, the said tubes passing through the frames of the quadrants themselves and allowing to give to these quadrants independent movements, all parallel to the movement of the carriage. These movements are controlled by means of screws 13 operated through small hand-wheels 14.

The second screen, which will be hereafter referred to as the plain screen, consists of a strong supporting frame of the same size as the screen 10 and carrying a ground glass plate which takes up the whole inner space of the frame.

The lamp holder is so arranged as to allow any orientation of two or three projection lamps carried thereby providing for a variation of the distance between these lamps. For this purpose, the lamps are capable of vertical and horizontal displacement and also of a rotary movement around a vertical axis or a horizontal axis parallel to the screen, which axes both pass through the optical center of their respective lenses.

For this purpose the apparatus comprises a vertical frame 15 forming a guide for two sliding cross bars 16' 16''. (Fig. 6.) The movement of these is controlled by means of screws 17', 17'' operated by small hand-wheels 18', 18'' and passing through nuts provided in two cross bars 19', 19'' fixed upon the lower and upper ends of frame 15. The plane of the frame is perpendicular to the direction of the movement of the screen-bearing frame. Two symmetrical supports 20', 20'' for the lamps are provided on the inner side of each cross bar and are formed by metal frames allowing for movements of translation and rotation of the lamps. The latter are used for the projection of the two negatives of the ground successively obtained with the same photographic camera. In order to exactly place the plate of the negative in the proper position, a frame is provided which is connected with the projection lens and carries a wire-reticule, whose wires intersect in the optical axis.

The objective lens of the photographic machine used in the survey is also provided with a similarly arranged reticule, and whose image is reproduced on the negative. Thus it will be easy to replace the latter in the very same position in respect of the lens of the projection lamp.

The regulation of the plate orientation, after having brought the intersection point of the images of the reticule on optical axis of the projection lens, is easily effected, the plate being capable of rotating around said axis by means of screws which allow of micrometrical adjustment.

For focusing a rack and pinion system is used. The entire projection apparatus, i. e. the lens carrier 21, negative plate carrier 22, condenser carrier 23 and lamp carrier 24 are mounted for sliding along a guide bar 25.

The above description of the apparatus, enables one to readily understand the manner of proceeding for making a survey, the latter being assumed to be effected from aboard a flying airship. The survey must begin with a plate including a portion of ground upon which are found at least three points the position of which is exactly known. However, it would be more convenient to have four such points so that the fourth may serve as a control. Also the second plate must include a portion of ground on which appear the same aforesaid points or other three or four exactly known points. The successive plates must be taken in such a way as to include a tract of ground in common to three or four plates.

In this latter case, in order to avoid the inconvenience resulting from a too small scale and in order to facilitate the proceedings, the survey should be effected by coupling alternately two plates, both odd numbered or both even numbered.

The aforesaid common tract of ground serves to connect the successive plates. The ground to be surveyed must appear on at least two plates in order to make possible the survey. After having obtained the negatives as above said, one places the first two negatives containing the four points of the reference quadrangle, in the projection apparatus each in line with a lamp 26 with the sensitive layers toward the projection lens 27, whereas the images of the two wires of the photographic camera reticule are brought to coincide with the wires of the projection apparatus reticule.

When the plates overlap too much, the two projection lamps cannot be brought with their optical axes at the required distance, in which case the lamp must be provided with a deviating optical system consisting of mirrors or prisms enabling the plates to be placed in the proper position, without the projection apparatuses interfering with each other.

The plates having thus been placed, the screen with the movable quadrants is mounted upon the sliding carriage, the four quadrants being first arranged on a single plane on which the horizontal projection of the fundamental quadrangle is drawn showing each of its vertex arranged on a different quadrant. This condition is necessary when the four points have a different height, but if two or three points should be at the same height they could also fall without inconvenience on the same quadrant. Then the four quadrants are shifted so that each one of them takes up in respect of an arbitrary reference plane, for instance the plane of the frame, the distances corresponding to the level differences of the points given. By this operation the four points are caused to take up at the reproduction scale, the same relative position and the same relative distances as the above referred to four points of the ground.

The two negatives are afterward projected separately on the screen, and, by imparting suitable movements to the projecting apparatus, the images of the four known points are brought, after successive attempts, to coincide with the vertexes of the fundamental quadrangle drawn on the screen quadrants.

Thus, the two plates will be placed in respect of the fundamental quadrangle of the screen in the same position and distance, at the reproduction scale, which they had in respect of the ground at the moment of the exposure. Of course, attention must be paid to constantly maintaining the projection focused on the quadrant screen while the position of the plates is varied to give them the position and orientation required.

Having thus set the apparatus the plain screen is substituted for the quadrant screen and upon it are projected simultaneously the pictures of the two plates.

If it is required to plot the contour lines, the screen is successively shifted causing it to occupy successively positions corresponding to the reproduction scale, to the planes of the contour lines the points sought. In these different positions are sought the two images which coincide together and by uniting them with a continuous line the contour lines are obtained. Some slight shifting movements backward and forward given to the screen render the points sought at once more visible.

Having thus determined the points common to the two plates, the second and third are connected by using the points contained in the portion in common with the three plates.

If along the way points of known position are met, they will serve as control for the operations already carried out; otherwise, starting from the last plate, the operations are repeated in the reverse direction for the purpose of obtaining an average of the errors.

I claim:

1. The method of photogrammetric survey which consists in taking two negatives of the ground to be surveyed, developing and then arranging them in the position and orientation occupied by them in respect to the ground at the moment of the exposure; projecting the images of the said two negatives thus placed through lenses having the same focal length as the photographic lenses, receiving the images of the said two negatives upon a movable screen representing a plane of the space; moving the screen so as to correspond successively to several planes of the space selected according to a given law seeking in each position of the screen and marking thereon the places of the points the two images of which coincide, the said points being for each position of the screen the image on same of the line along which the corresponding plane of the space intersects the ground.

2. The method of photogrammetric survey as specified in claim 1, in which the planes of the space are selected among the horizontal planes, so that their intersections with the ground represent as many contour lines.

3. Apparatus for making photogrammetric surveys comprising a movable carriage, means for shifting said carriage projection screens on said carriage, a frame adapted to receive the said projection screens, means for moving the screen bearing frame in respect of the carriage, a projection apparatus having at least two projecting lamps adapted to receive the negatives of the ground, means in connection with each lamp enabling the same to be moved according to two directions normal between them and to the direction of the movement of the said carriage, means for rotating each lamp around two axes normal between them, and means for focusing the images of the negative upon the projection screen.

4. In an apparatus as specified in claim 3, a screen bearing frame carrying a plurality of movable screens, means for moving said screens one independently from the other in a direction perpendicular to the frame plane, and means enabling to keep said screens adjusted at will at a predetermined measurable distance.

In testimony whereof I have affixed my signature in the presence of two witnesses, this 24th day of August, 1920.

UMBERTO NISTRI.

Witnesses:
AMADEO NISTRI,
LETTERO LABSCRITTI.